(No Model.)

C. MOYER.
POWER TRANSFERRING APPARATUS.

No. 541,565. Patented June 25, 1895.

Witnesses.

Inventor.
Charles Moyer.
Per O. D. Levis.
Atty.

UNITED STATES PATENT OFFICE.

CHARLES MOYER, OF MIDDLE LANCASTER, PENNSYLVANIA.

POWER-TRANSFERRING APPARATUS.

SPECIFICATION forming part of Letters Patent No. 541,565, dated June 25, 1895.

Application filed June 8, 1894. Serial No. 513,881. (No model.)

*To all whom it may concern:*

Be it known that I, CHARLES MOYER, a citizen of the United States, residing at Middle Lancaster, in the county of Butler and State of Pennsylvania, have invented certain new and useful Improvements in Apparatus for Transferring Power; and I do hereby declare the following to be a full, clear, and exact description of the invention, such as will enable others skilled in the art to which it pertains to make and use the same, reference being had to the accompanying drawings, which form a part of this specification.

My invention relates to an improved device for transferring power, having for its object more particularly to adapt a power transferring device to transmit power in any required direction according to the relative position or location of the machinery to be driven, and to this end it consists of the detailed combination and arrangement of parts, substantially as hereinafter more fully disclosed and pointed out in the claim.

Figure 1:
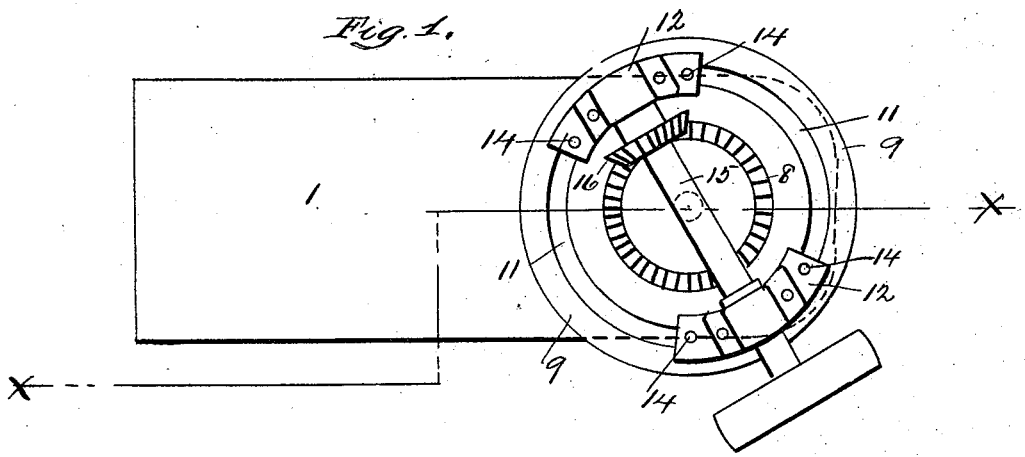
Figure 2:
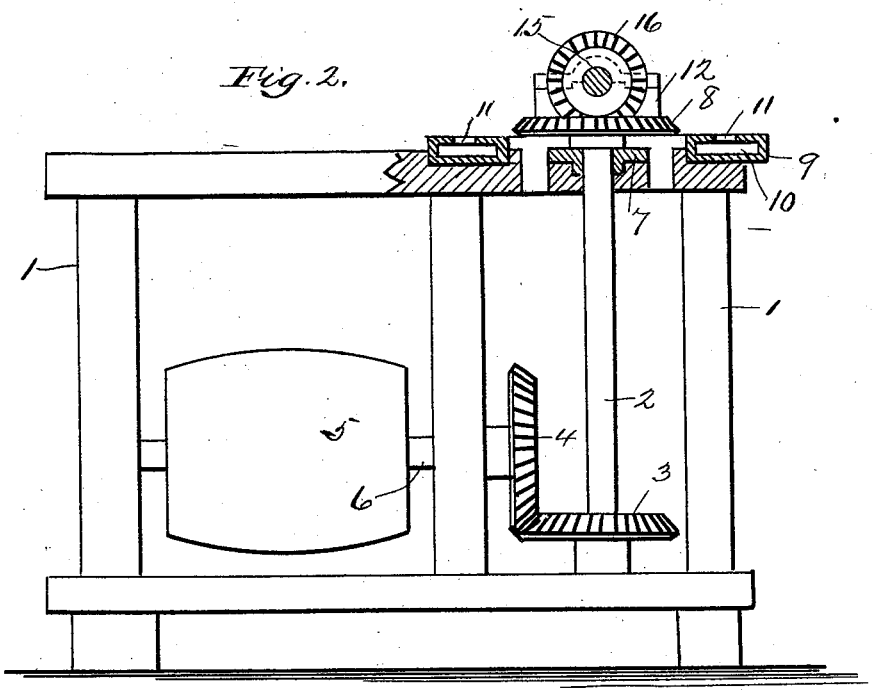
Figure 3:
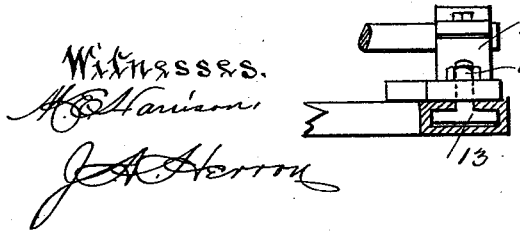

In the accompanying drawings, Figure 1 is a plan view of my improved apparatus, which is constructed and arranged in accordance with my invention. Fig. 2 is a side elevation of the same, a part of which is shown in section. Fig. 3 is a sectional side elevation through a portion of the annular clamp, showing the manner in which the shaft-bearings are secured.

To put my invention into practice I provide a frame 1 of a suitable size and form of construction, and mount therein a shaft 6 provided with a pulley 5 and gear wheel 4. This gear wheel 4 meshes with another 3 attached to a shaft 2, arranged in a vertical position in suitable bearings 7 at the top and bottom of the frame 1.

Attached to the top of the frame 1 is an annular clamp 9 formed with an inner recess 10 and annular opening or slot 11. Mounted upon the clamp 9, are two bearings 12, supporting the shaft 15, provided with a beveled gear 16, meshing with a larger, similar gear 8, carried at the upper end of the shaft 2. The bearings 12, are movably held upon the clamp 9, by plates 13, arranged in the recess 10, of said clamp, and having integral therewith bolts 14, projecting up through the circular opening or slot 11 in said clamp and provided with nuts bearing upon said clamp.

Connected to the shaft 15 is a pulley by means of which the power applied to the pulley 5 may be transmitted by a belt to another apparatus located at any point either in line with the pulley 5 or at any angle thereto, thus avoiding shifting the relative position of the said parts.

Having thus described my invention, what I claim, and desire to secure by Letters Patent, is—

The combination of the annular clamp having a circular recess and a similar slot or opening communicating with said recess, movable bearings mounted upon said clamp, the plates arranged in said recess, and having bolts projecting up through said slot and said bearings and fitted with nuts above said bearings, a vertical shaft having its upper end provided with a beveled gear-wheel above the plane of said clamp, and its lower end also provided with a beveled gear-wheel, a horizontal pulley shaft journaled in said bearings and having a beveled pinion meshing with the upper gear-wheel, and a second horizontal pulley-shaft having also a beveled gear-wheel meshing with the lower gear-wheel of said vertical shaft, substantially as described.

In testimony that I claim the foregoing I hereunto affix my signature this 8th day of March, A. D. 1894.

CHARLES MOYER. [L. S.]

In presence of—
JAS. J. MCAFEE,
M. E. HARRISON.